US012728633B2

(12) United States Patent
Luid Pinol et al.

(10) Patent No.: US 12,728,633 B2
(45) Date of Patent: Sep. 8, 2026

(54) PRINTHEAD POSITIONS

(71) Applicant: Hewlett-Packard Development Company, L.P., Spring, TX (US)

(72) Inventors: Nestor Luid Pinol, Sant Cugat del Valles (ES); Alexander Jose Perez Garcia, Sant Cugat del Valles (ES); Jordi Bas Ferrer, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 133 days.

(21) Appl. No.: 18/579,306

(22) PCT Filed: Jul. 15, 2021

(86) PCT No.: PCT/US2021/041850

§ 371 (c)(1),
(2) Date: Jan. 12, 2024

(87) PCT Pub. No.: WO2023/287419

PCT Pub. Date: Jan. 19, 2023

(65) Prior Publication Data

US 2024/0326407 A1 Oct. 3, 2024

(51) Int. Cl.

| | |
|---|---|
| ***B41J 2/045*** | (2006.01) |
| ***B41J 2/165*** | (2006.01) |
| ***B41J 2/175*** | (2006.01) |
| ***B41J 2/21*** | (2006.01) |
| ***B41J 25/34*** | (2006.01) |

(52) U.S. Cl.
CPC ....... *B41J 2/04505* (2013.01); *B41J 2/04551* (2013.01); *B41J 2/16579* (2013.01); *B41J 2/1752* (2013.01); *B41J 2/2117* (2013.01); *B41J 25/34* (2013.01); *B41J 2/0451* (2013.01); *B41J 2/2142* (2013.01)

(58) Field of Classification Search
CPC ................ B41J 2/04505; B41J 2/04551; B41J 2/16579; B41J 2/1752; B41J 2/2117; B41J 25/34; B41J 2/0451; B41J 2/2142; B41J 2/125; B41J 2/17546; B41J 2/2135; B41J 2/04586
See application file for complete search history.

(56) References Cited

U.S. PATENT DOCUMENTS

| | | | |
|---|---|---|---|
| 5,350,929 | A | 9/1994 | Meyer et al. |
| 2004/0119779 | A1 | 6/2004 | Elgee |
| 2008/0278527 | A1 | 11/2008 | Newell |
| 2009/0213154 | A1 | 8/2009 | Silverbrook et al. |

(Continued)

FOREIGN PATENT DOCUMENTS

| | | | | |
|---|---|---|---|---|
| CN | 104619503 A | | 5/2015 | |
| CN | 108568382 A | * | 9/2018 | ......... H04N 1/00761 |

(Continued)

*Primary Examiner* — Justin Seo
(74) *Attorney, Agent, or Firm* — Jordan IP Law, LLC

(57) ABSTRACT

In an example, a method includes ejecting a drop of printing fluid from a nozzle of a printhead into a drop detection zone. An indication of detection of the drop within the drop detection zone may be determined and, based on the indication of detection of the drop, an indication of a position of the printhead may be provided.

15 Claims, 4 Drawing Sheets

(56) References Cited

U.S. PATENT DOCUMENTS

| | | | | |
|---|---|---|---|---|
| 2013/0021398 | A1* | 1/2013 | Mizes | B41J 2/2114 347/14 |
| 2013/0293612 | A1* | 11/2013 | Smith | H04N 1/506 347/14 |
| 2015/0202867 | A1* | 7/2015 | Koga | B41J 29/02 347/14 |
| 2018/0111367 | A1 | 4/2018 | Gomez et al. | |
| 2019/0230248 | A1 | 7/2019 | Mizes et al. | |
| 2021/0039409 | A1 | 2/2021 | Costal Fornells et al. | |

FOREIGN PATENT DOCUMENTS

| | | | |
|---|---|---|---|
| JP | 06-198892 | A | 7/1994 |
| WO | 2021/061087 | A1 | 4/2021 |

* cited by examiner

PRINTHEAD POSITIONS

BACKGROUND

Some print apparatus, or printers, dispense print materials such as coloring agents (for example comprising a dye or colorant), primers and/or coatings, from a printhead. An example printhead includes a set of nozzles and a mechanism for ejecting a selected agent as a fluid, for example a liquid, through a nozzle. In some such print apparatus, some print materials may be applied to a substrate before others. For example, a coating may be printed onto a substrate after a coloring agent has been printed thereon, such that it provides a coating on top of the colorant.

BRIEF DESCRIPTION OF DRAWINGS

Examples will now be described with reference to the accompanying drawings, in which.

DETAILED DESCRIPTION

In some print apparatus, the order in which print materials such as printing fluids are applied to a substrate or a media may be different in different modes. For example, in an 'underflood' mode, it may be intended to apply a white printing fluid to a substrate prior to printing colored printing fluids, such that the colored printing fluid may be printed on top of the white printing fluid. In an 'overflood' mode, white printing fluid may be applied after colored printing fluids. In some examples, primer fluids, also called 'optimizer' fluids, may be printed prior to printing colorants and the like, and may enhance fixing of other printing fluids. Moreover, overcoats may be printed after colored printing fluids, for example to provide gloss or to protect underlying printed images.

While examples herein are generally described in relation to 2D printing, in which printing fluids may be applied to substrates or media such as, for example, paper, plastics, cardboard or the like, the principles may also be applied in relation to 3D printing, in which printing fluids may be applied to a layer of granular build material. Such printing fluids may in some examples directly bind the particles of the granular build material together, or may be cured to cause binding thereof. In further examples, printing fluids may comprise at least one print agent with a composition which absorbs heat and, when heat is applied thereto, the particles of granular build material may be caused to melt and fuse together, thereby generating three-dimensional objects in a layer by layer manner.

In order to reconfigure a print apparatus into different modes, the physical position of the printheads relating to the different printing fluids may be adjusted. For example, when considering a direction of travel of a substrate, or a direction of 'media advance' through a print apparatus (although in principle, the printhead(s) may instead be moved while the substrate remains static), in an underflood mode, the printheads may be positioned such that the substrate passes under the white printhead before passing under other colored printheads (e.g. printheads to print a set of colors such as Cyan, Yellow, Magenta and Black). The printer may be reconfigured into an overflood mode by physically repositioning the white printhead forwards in the direction of media advance and/or repositioning the colored printhead(s) against the direction of media advance, so that the substrate passes under the colored printheads before passing under the white printhead.

Such reconfiguration may be a manual process and as such is subject to user error. If the printheads are wrongly positioned, this may result in wasted substrate and printing fluid before the error is detected.

Figure 1:
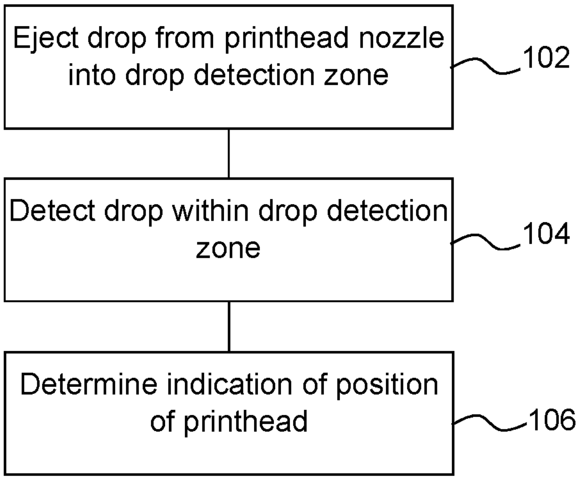
FIG. 1 is an example of a method for determining an indication of a position of a printhead.

FIG. 1 is an example of a method of providing an indication of a position of a printhead.

Block 102 comprises ejecting a drop of printing fluid from a nozzle of a printhead into a drop detection zone. In some examples, the nozzle is a predetermined nozzle of the printhead and the printhead is controlled to eject printing fluid by a controller, or control apparatus, of a print apparatus in which the printhead is provided or installed. As is further set out below, in some examples, the print apparatus comprises a carriage for receiving a printhead, or a plurality of printheads, and in some examples, at least some of the printheads may occupy one of a number of positions such that the printheads are offset from one another in a direction of printing, or a direction of media advance through the print apparatus.

The drop detection zone may comprise a region of a drop detector. The drop detector may be a drop detector of the print apparatus in which the printhead is installed. In some examples, the drop detector may be used by the print apparatus (or more specifically the control apparatus thereof) to detect whether drops are being ejected from individual nozzles of a printhead. In some examples, the drop detector may additionally be used to detect blocked, partially blocked or otherwise malfunctioning nozzles.

Block 104 comprises determining, for example by processing circuitry or control apparatus of the print apparatus, an indication of detection of the drop within the drop detection zone. In some examples, determining the indication of the detection of the drop may comprise determining that the drop is present or absent within the zone. In other examples, determining the indication of the detection may comprise determining an indication of the location of the drop within the zone, i.e. where, relative to the dimensions of the zone, the drop was detected.

In some examples, a drop detector may for example comprise one or a plurality of drop detection units, each drop detection unit comprising a radiation source (e.g., an LED) and a radiation detector, for example a photodiode. A falling drop may interrupt a beam of radiation, and allow detection thereof. In some examples, the location of the drop may be determined by determining which of a plurality of drop detection unit(s) detect the interruption of the beam. In other examples, other methods for detecting a location of a drop may be used. For example, the drop may reflect light and time-of-flight analysis may be used to determine its location, a scanning detection/emitting apparatus may be used, or the like.

Block 106 comprises determining, for example by processing circuitry of the print apparatus) an indication of a position of the printhead based on the indication of detection of the drop. For example, the indication of the position of the printhead may be an indication of whether the printhead is in an expected position, for example a position corresponding to an intended mode of operation, such as an underflood or an overflood mode. In another example, the indication of the position of the printhead may be an indication that the printhead is not in an expected position. In another example, the indication of the position of the printhead may for example comprise a specification of one of a plurality of 'indexed' or predetermined possible positions, wherein the positions may indicate a place in an order of the printheads in a direction of printing. In one example, the indication may be an indication of the print mode (e.g. underflood, overflood, etc.), as determined from the position, or relative positions, of the printhead(s).

The indication of the position of the printhead may, for example, be a visual indication. For example, a display apparatus of a print apparatus may be controlled to display the indication of the position of the printhead. In some examples, the indication may be sent to a remote device, such as a user's computer, mobile telephone or tablet computer. In some examples, the indication of the position of the printhead may, for example, be an audible indication, for example an audible alert indicating that the printheads are in an intended position or otherwise are not in the intended position. In some examples, the indication of the position of the printhead may be used internally in the print apparatus, for example to prevent the print apparatus from commencing a print operation in the event that the printheads are not in an expected position. In such examples, the indication of the position of the printhead may comprise the setting of a processing flag or the like.

As mentioned above, the drop detector may be used to perform other operations within the print apparatus. For example, print apparatus has been proposed in which drop detectors may be used to determine whether nozzles of a printhead are fully or partially clogged and would benefit from cleaning or having some other maintenance operation performed thereon. While it may be possible to detect the position of the printheads using dedicated detection apparatus, this adds to the complexity of the print apparatus, and adds new potential points of failure. Therefore, the method proposed above may use a drop detector of a print apparatus which is also used to monitor nozzle health, for example by identifying blocked and partially blocked nozzles and the like.

In some examples, it may be the case that a printhead is controlled to eject a drop, but no drop is detected. This may be indicative that the printhead is in an unintended position, although it may also have other causes, such as a blocked printhead, or may indicate that a printhead carriage or drop detector is in an unintended position. In such examples, an alert may be generated for a user. In some examples, if a drop is not detected, the printhead and/or the drop detector may be repositioned and the method may be repeated. This may allow a plurality of possible positions of a printhead to be tested in turn, in some examples starting with an expected position.

Figure 2:
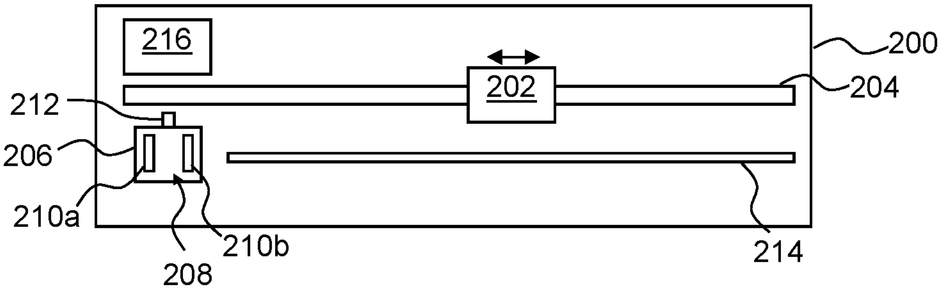
FIG. 2 is a simplified schematic of an example of a print apparatus.

FIG. 2 shows a schematic example of a print apparatus 200. In this example, the print apparatus comprises a carriage 202 mounted on a rail 204, which defines a scan axis perpendicular to the direction of media advance during printing. As is described in greater detail below, in use of the print apparatus 200, the carriage 202 contains one or more printheads. In some examples, the printheads may be integral to replaceable printing fluid cartridges whereas in other examples the printheads may be separate therefrom.

In addition, the print apparatus 200 comprises a drop detector 206, in which a drop detection zone 208 is defined, in this example, between two sensor units 210*a*, 210*b*. In this example, the drop detector 206 is mounted on a rail 212, visible in cross section in the Figure, which is generally perpendicular to the rail 204 on which the carriage 202 is mounted (i.e. the rail 212 extends through the plane of the page as shown in the Figure), to allow repositioning of the drop detector 206 in a direction which is substantially orthogonal to the scan axis of the carriage, and parallel to the direction of media advance in this example or more generally the 'direction of printing' as the term is used herein. While rails 204, 212 are described in this example, other adjustable mounting apparatus may be used in other examples.

A substrate slot 214 is also shown, and the print apparatus 200 is provided with a control apparatus 216, wherein the control apparatus 216 comprises processing circuitry of the apparatus 200.

In use of the print apparatus 200 in this example, a substrate is moved, for example by rollers or the like (not shown) under the carriage 202, and out through the substrate slot 214. During printing, the carriage 202 is driven backwards and forwards along the rail 204. During maintenance and/or setup procedures, the carriage 202 may be positioned such that it is above the drop detector 206 such that drops of fluid may be ejected into the drop detection zone 208. The drop detector 206 may be moved along its mounting rail 212 to position the drop detection zone 208 under different regions of the carriage 202.

While in this example, a single carriage 202 and drop detector 206 are shown, there may be more in other examples. In addition, while in this example the media is driven to define the direction of printing, in other examples, the rail 204 may be moved or scanned over a substrate, in a direction perpendicular to the scan axis and into the page as shown in the Figure, and the movement thereof may define the direction of printing. Generally, in examples, a substrate or media may be printed line by line by relative movement of the carriage and the substrate along a scan axis which is parallel to the plane of the substrate being printed, and the apparatus 200 may be further controlled such that the printed lines are displaced from one another in a second axis, which is orthogonal to the scan axis and parallel to the plane of the substrate being printed, and referred to herein as the direction of printing.

The control apparatus 216 may, for example, control the print apparatus 200 to carry out block 102 of FIG. 1 and may carry out blocks 104 and 106. As is described in greater detail below, the control apparatus 216 may control a printhead to fire a drop of printing fluid from a nozzle and receive a signal indicative of the detection (and in some examples, location) of the ejected drop from the drop detector 206. The signal be for example be sent via a wired connection or wirelessly. This may be an indication of the presence or absence of the drop, or an indication of a location of the drop within the drop detection zone 208. The control apparatus 212 may further derive, based on the detection of a drop by the drop detector 206, an indication of the position of the printheads within the carriage 202. In some examples, the control apparatus 212 may determine a relative order of the printheads in the direction of printing, in this example the direction of media (or substrate) advance. The order may be determined explicitly or implicitly. In some examples, the control apparatus 216 may further determine if the relative order of the printheads is an expected order and, when the relative order of the printheads is not in an expected order, generate an alert. In some examples, the print apparatus 200 may further comprise notification apparatus, such as a screen and/or a speaker, to communicate an alert to a user.

Figure 3A:
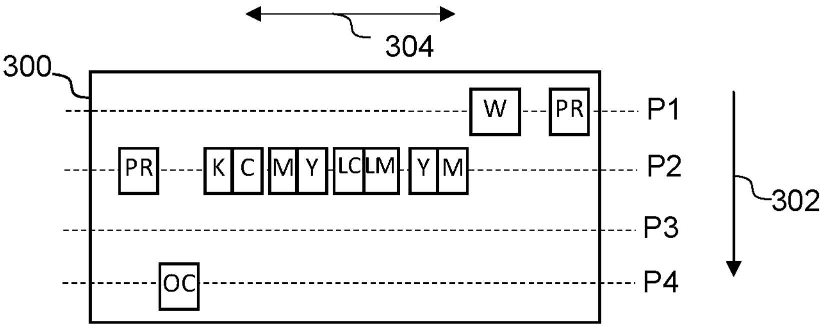
FIGS. 3A-3C show examples of arrangements of printheads within a print apparatus carriage.
Figure 3B:
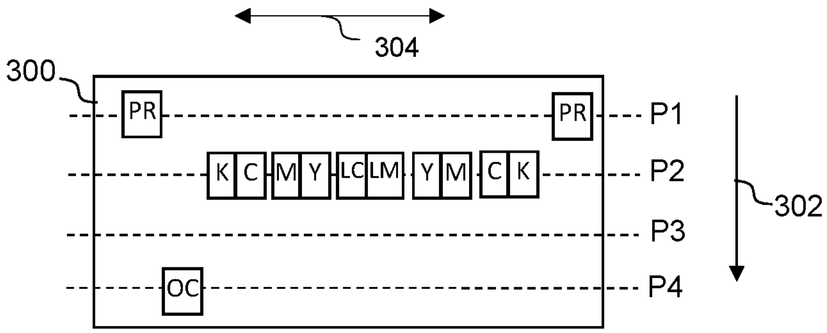
Figure 3C:
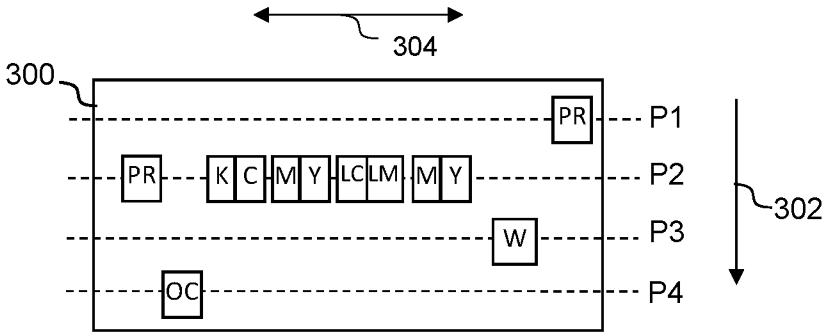

FIG. 3A-C show examples of arrangements of printheads within a carriage 300, which provides an example of the carriage 202 shown in FIG. 2. While in this example, a single carriage comprises a plurality of printheads, in other examples multiple carriages may be provided, each comprising one or a plurality of printheads.

FIG. 3A shows the arrangement of a number of printheads in an underflood mode. The printheads are shown with identifiers marked thereon. PR represents a printhead which is intended to dispense a primer fluid which, as discussed above, may aid fixing of other printing fluids to a substrate or media. C indicates a printhead which is intended to dispense cyan printing fluid, Y indicates a printhead which is intended to dispense yellow printing fluid, M indicates a printhead which is intended to dispense magenta printing fluid and K indicates a printhead which is intended to dispense black printing fluid. LC and LM designate printheads which are intended to dispense a 'light cyan' and a 'light magenta' printing fluid. W designates a printhead which is intended to dispense a white printing fluid, and OC designates a printhead which is intended to print an overcoat fluid, for example a varnish or the like, which may be intended to add gloss and/or protection to a printed image.

While not shown herein, each printhead comprises an array of nozzles, for example arranged into columns. In use of the printhead, control signals may be sent to each printhead to selectively cause a drop of printing fluid to be ejected from a particular nozzle. For example, in an inkjet system, a piezoelectric element or a resistive heating element may be activated within a chamber containing printing fluid, forcing a drop of printing fluid to be ejected via a nozzle associated with that chamber.

Each of the printheads can occupy one of four positions relative to a direction of printing, or direction of media advance, within the carriage 300. In this example, a white printhead and a primer printhead are provided in a first position, P1, and primer printhead and the various colored printheads occupy a second position, P2. There is a further defined position, P3, but in this example, no printheads are positioned in P3. The overcoat printhead occupies a third position P4.

In this example, therefore, the carriage 300 is configured to receive the printhead at one of a plurality of indexed positions P1 to P4. Moreover, the indexed positions are offset from one another in a direction of printing, which is indicated by the arrow 302. In this example, the arrow 302 indicates the direction of media advance relative to the printheads, although in other examples the printhead may move over a static substrate or media in the printing direction, and/or in two orthogonal directions.

As can be seen, in this configuration, the media will pass under the printheads in the P1 position, then the printheads in the P2 position, then any printheads in the P3 position, and finally any printheads in the P4 position. During printing, the carriage 300 may be scanned in a scan axis indicated by the double headed arrow 304, for example along a rail 204 as described with reference to FIG. 2.

In particular, with reference to the arrangement shown in FIG. 2 and the arrangement printhead shown in FIG. 3A, at the start of a printing operation, the carriage 202, 300 may be positioned to the left of the apparatus 200 and may pass over the substrate along the rail 204 left to right. This may allow a primer to be printed, immediately followed by white printing fluid. The substrate may then be advanced such that the printed region underlies the printheads in the P2 position. The carriage 202, 300 may then pass back along the rail 204 right to left, printing primer fluid and then color onto the now white printed region, the controller 216 causing the nozzles of the printheads to selectively eject printing fluid according to print instructions to print an image. The substrate then advances again such that the portion of the substrate which has been printed with white printing fluid and colored printing fluid underlies the printhead in the P4 position, and this portion may then be printed with an overcoat. In some examples, while one region of the substrate is being printed to by printheads in a given indexed position, another portion of the substrate may be being printed to buy printheads in another indexed position.

FIG. 3B shows a different arrangement of printheads, using the same notation as described in relation to FIG. 3A. The arrangement of printheads shown in FIG. 3B is intended to provide a 'turbo mode' in which colored printing fluids (i.e. the CMYK and LC and LM colors) may be printed in both directions of travel of the carriage 300. There is no white printhead provided in this example, and two primer printheads are provided in position P1. The arrangement of the colored printing fluids in position P2 is generally symmetrical such that black ink may be applied to the substrate immediately after a primer when the carriages travelling in either direction. By providing a symmetrical arrangement of printheads, a visual difference in the printed output may be reduced. By contrast, if the colors are provided in a different order for different scan directions, the printed output may have a striped appearance. It may be noted that, compared to the arrangement shown in FIG. 3A, both the identity of the printheads, and the location of at least some of the printheads in the direction of printing 302, is different.

FIG. 3C shows a further arrangement, in this example to provide an 'overflood' mode, in which white printing fluid may be applied on top of colored printing fluid. This may for example be the case when printing to a transparent substrate wherein the colored image is intended to be viewed through the substrate. In this example, a white printhead is provided in position P3, such that the substrate passes under the white printhead after having been printed with the colored printheads which occupy P2.

While the examples of FIG. 3A-C show specific arrangements of positions P1 to P4, and particular choices of printheads, other arrangements are possible. For example, while the positions are equally spaced in the examples shown, this may not be the case in all examples. The number of available positions for printheads within a carriage both horizontally and vertically as shown may be different from that depicted in the Figures.

Repositioning the printheads between configurations may be a manual task. A user may access the interior of the print apparatus 200 and physically remove and reposition printheads, for example by repositioning printing fluid cartridges including integral printheads. Errors can occur, and if these errors are not detected until printing has started, printing fluids and substrate may be wasted.

Figure 4:
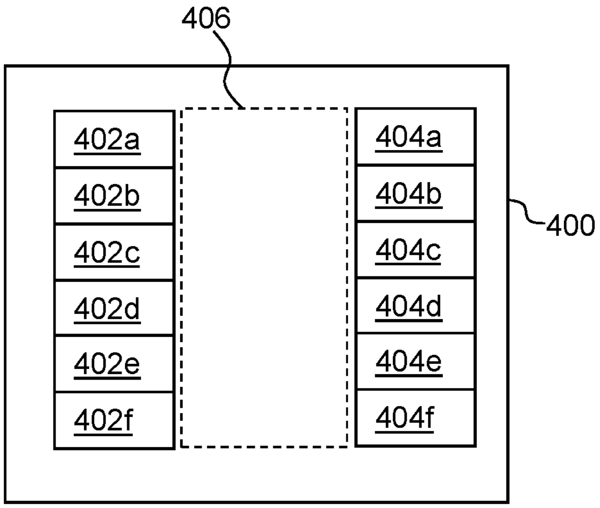
FIG. 4 is a simplified schematic of an example of a drop detector.

FIG. 4 shows an example of a drop detector 400, which provides an example of a drop detector 206 as described above. In this example, an array of emitters, in this example red LEDs 402_a-f_, hereinafter referred to as LEDs 402, faces an opposing array of receivers, in this example photodetectors 404_a-f_, hereinafter referred to as photodetectors 404, with a drop detection zone 406 defined therebetween. The drop detector 400 is to detect a drop of fluid (which may be, for example a print material such as a primer, ink, coating or other print material) passing through the drop detection zone 406 defined between the LEDs 402 and the photodetectors 404. In this example, the photodetectors 404 are photodiodes.

In some examples, the LEDs 402 may be controlled individually or collectively to emit a beam of light. A drop passing between the LEDs 402 and the photodetectors 404 creates a shadow. At least one photodetector 404 may detect this passing shadow, which is indicative of a drop of printing fluid, when the intensity of light detected by at least one of the photodetectors 404 decreases, allowing the presence of a drop to be detected. In addition, the identity of a photodetector 404 which detects the greatest fall in intensity is indicative of the location of the drop within the drop detection zone 406.

While in this example, LEDs are described, in other examples the radiation source may comprise some other radiation source, such as another light source or a source of gamma radiation or the like. A suitable radiation detector may be selected accordingly. Moreover, while in this example, an array of photodetectors provides an indication of the location of the drop, this may also be provided in some other way. For example, time-of-flight analysis may be used to determine a location of a drop of printing fluid within the drop zone and therefore the location of the printhead which dispensed the drop. In other examples, the detection of a drop may be a detection that the drop is within the drop detections zone, rather than an indication of the location of the drop relative to the dimensions of the drop detection zone. In addition, while six pairs of radiation sources and detectors are shown herein, there may be more or fewer sensor pairs in other examples. For example, there may be one such pair, or 12 such pairs, or any other number.

Referring to the example of apparatus 200 of FIG. 2, the carriage 202 may be re-positioned above the drop detector 206, 400 and controlled to eject printing fluid as described in relation to block 102 above. In one example, each printhead which is present in a carriage 202 may be caused, in turn, to eject a drop of printing fluid from at least one nozzle therein. In some examples, the carriage 202 and/or the drop detector 400 may be repositioned between ejection of the drops, for example if the detection zone is smaller than a dimension of the carriage 202 or the footprint of the printheads therein. For example, they may be repositioned on their respective rails 204, 212.

If the apparatus 200 includes printheads configured according to an intended print mode, this may be confirmed by detecting the location of the drops, as described above in relation to block 104. Alternatively, if a drop is detected in a location which does not correspond to an expected location, this may suggest that an error has occurred during configuration of the printheads within the carriage 202. Thus, determining the indication of the position of the printhead or printheads may comprise confirming that a printhead is in an intended position within the carriage or otherwise generating an alert or the like to indicate that at least one printhead is not in its intended position.

As mentioned above, the drop detector 400 may also be used to perform other drop detection activities, such as evaluating nozzle status or health, for example by determining whether the nozzles of a printhead are blocked and, in some cases, evaluation of the quality of a drop relative to a predetermined standard (for example to detect a partial blockage), a direction of travel of the drop, or the like.

Figure 5:
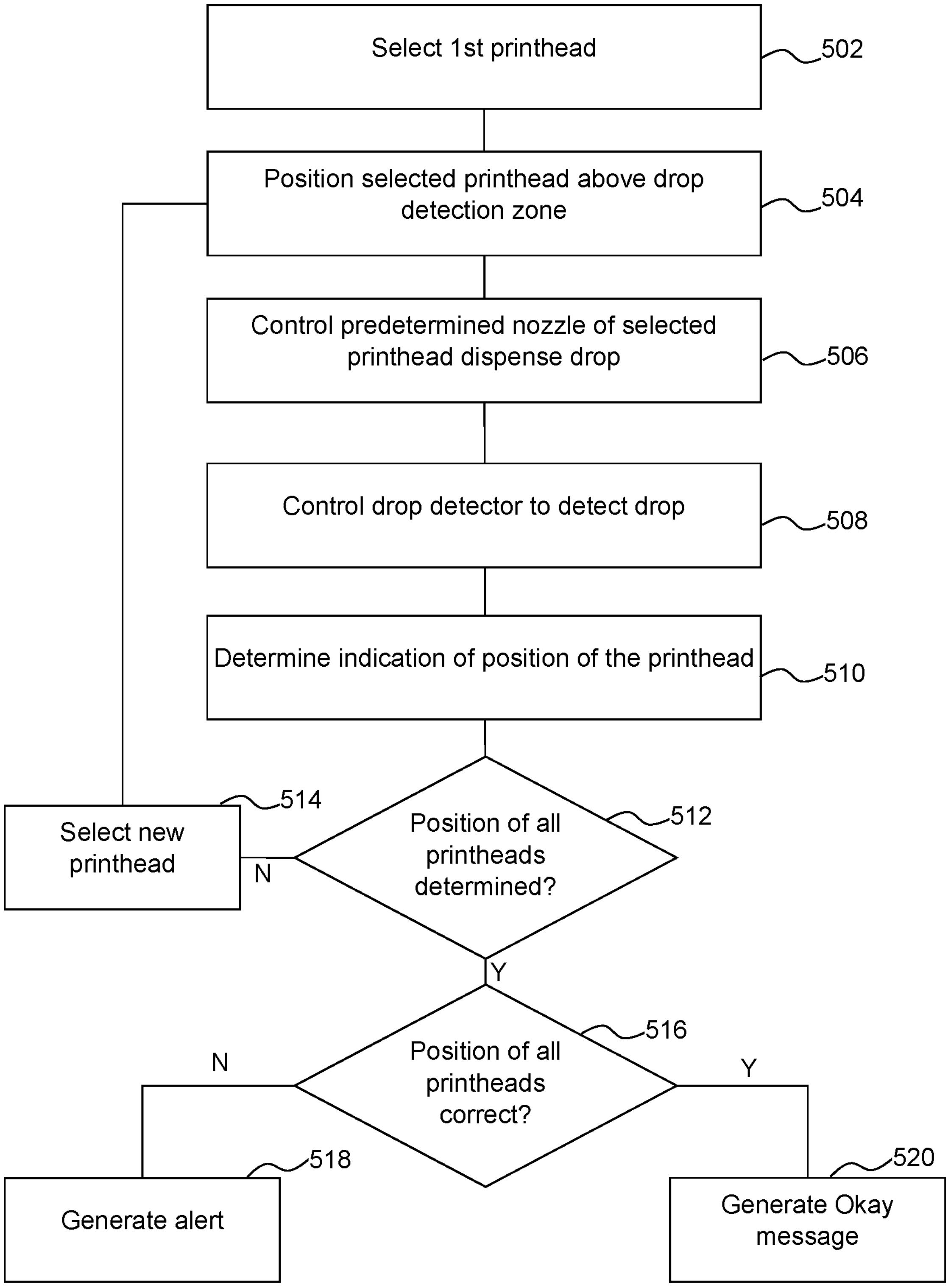
FIG. 5 is an example of a method for determining an indication of a position of a plurality of printheads.

FIG. 5 is an example of a method for determining a position of each of a plurality of printheads within a carriage of a print apparatus, such as the print apparatus 200 described above. In some such examples, the method may be carried out by the control apparatus 216 of the apparatus 200.

Block 502 comprises selecting a first printhead of the plurality of printheads and block 504 comprises positioning that printhead above a drop detection zone. Considering the apparatus 200 of FIG. 2, this may for example comprise repositioning the carriage along the rail 204. In some examples, a drop detector may be movably mounted for example on a rail 212 as shown in FIG. 2. In such examples, the position of the drop detector may be adjustable at least in the direction of printing, whereas the carriage is configured to move in a direction orthogonal to the direction of printing. This may allow a printhead to be positioned over a drop detection zone by moving either or both of the drop detector and the carriage (or, in some examples a mounting rail 204, 212 or other adjustable mounting means). In some examples, this may comprise controlling the apparatus such that, if the printhead is in its expected position, it (or in some examples, the predetermined nozzle thereof which is to be controlled to dispense printing fluid) will be positioned above a drop detection zone.

Block 506 comprises controlling a predetermined nozzle of the selected printhead to dispense a drop of printing fluid. For example, this may occupy a predetermined position within the printhead, for example comprising the leading nozzle in the direction of printing for a selected printhead or some other identified position.

Block 508 comprises controlling a drop detector to detect the drop. For example, this may comprise controlling a radiation emitter of the drop detector to emit radiation. In some examples, all of a plurality of radiation emitters may be controlled to emit radiation whereas in other examples, a selected radiation emitter(s) which is associated with an expected location of the drop may be controlled to emit radiation whereas other radiation emitters may remain switched off.

An indication of the location of the printhead, which in this example is one of a plurality of predetermined, or indexed, positions relative to a direction of printing (for example, one of the positions P1 to P4 as described in relation to FIG. 3A-C) is determined in block 510.

In examples where the radiation emitter which is associated with an expected location of a drop is activated without activation of other radiation emitters, or there is a single detector, this may be a binary analysis: if a drop is detected then the printhead may be determined to be in its expected indexed location, whereas if a drop is not detected than the printhead may be determined to be in a different location, i.e. the location determined in block 510 is, in effect, “not the intended index location”, although this may be indicative of a blocked nozzle or some other fault, so in some examples a more general error may be detected. In some examples, when a drop is not detected, the relative position of the printhead and the drop detector may be adjusted, the printhead may be instructed to dispense a further drop, and the attempt to detect the drop may be repeated. This may be carried out to test potential positions of the printheads in order to determine the actual location, i.e. the location which corresponds to the detection of the drop.

In examples in which a number of radiation emitters are controlled to emit radiation, or the drop detector is otherwise configured to monitor the location of the drop within a drop detection zone, an absolute location of the drop within the zone may be determined and may be compared to each of the indexed locations. In this example, the indexed location which most closely corresponds to the location of the drop may be designated as the indexed location for that printhead.

Block 512 comprises determining whether an indexed position has been identified for all of the printheads. If not, the method proceeds to block 514 which comprises selecting another printhead and the method loops back to block 504, repositioning the relative position of the selected printhead and the drop detection zone as necessary, dispensing a drop of printing fluid from the selected printhead (block 506), detecting the drop (block 508) and determining an indexed position for that printhead (block 510). In some examples, if any iteration fails to detect a drop (in some examples following relative reposition of the selected printhead and the drop detector to carry out further drop detection tests as described above), an alert message may be generated, and the method may continue to select another printhead and/or the method may finish. Assuming an indexed position has been identified for all the printheads, the method proceeds to block 516, which comprises determining (in this example by processing circuitry or control apparatus of the print apparatus) whether each of the printheads are in their expected position. This may for example be based on an intended print mode (for example, underflood, turbo or overflood as described above, or some other print mode) as identified by a user. In some examples, this may comprise determining the order of the printheads in the direction of printing (for example, the direction of media advance), and/or determining the actual print mode based on the position of the printheads. This may then be compared, in this example by the control circuitry of the print apparatus (but in other examples, by a user), to the intended print mode.

If any of the printheads are not in their expected position, an indication, in this example, an alert, is provided to a user (block 518), for example via a display screen of the print apparatus or via a text message sent to an electronic device such as a laptop or mobile phone of the user. In some examples, any printhead which is not detected as being in its expected position may be identified. If all the printheads are in their expected position, an indication that the printheads are in their expected positions, in this example an 'okay' message, is generated (block 520), either for communication to the user or internally to the print apparatus.

In some examples, printing may be prevented until an 'okay' message is generated, until a user provides an indication that an alert may be overridden, and/or until a user confirms that printing should proceed.

Figure 6:
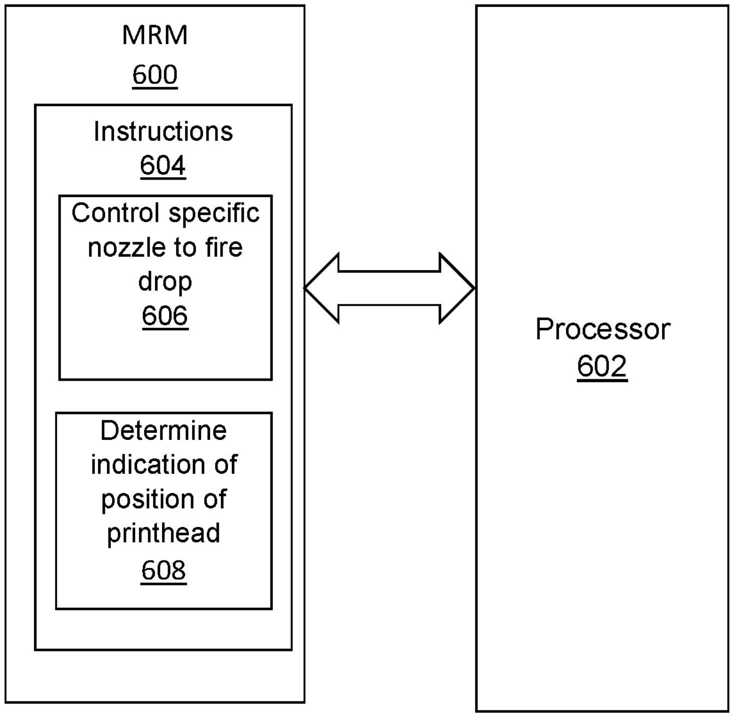
FIG. 6 is an example of a machine-readable medium in association with a processor.

FIG. 6 shows an example of a machine readable medium 600 in conjunction with a processor 602. The machine readable medium 600 comprises, or stores, instructions 604 which, when executed, cause the processor 602 to carry out tasks.

In particular, in this example, the instructions 604 comprise instructions 606 which, when executed, cause the processor 602 to control a specific nozzle of a printhead to fire a printing fluid drop into a drop detection zone of a print apparatus and instructions 608 which, when executed, cause the processor 602 to determine, from a detection of the drop within the drop detection zone (which may be an indication of the position of the drop within the drop detection zone), an indication of the position of the printhead.

The machine readable medium 600 may further store instructions which, when executed by the processor 602, cause the processor 602 to determine, from the indication of the position of the printhead, whether the printhead is in an expected position in a direction of printing, for example a direction of media travel during printing.

The print apparatus may, for example, be print apparatus 200 as described above. In some examples, the machine readable medium 600 may further store instructions which cause a print apparatus, and/or processing circuitry or control apparatus associated therewith, to carry out any of the blocks of FIG. 1 or FIG. 5. In some examples, the machine readable medium 600 may store instructions which cause the processor 602 to act as the control apparatus 216 described above.

The term 'processor' is to be interpreted broadly to include a CPU, processing unit, ASIC, logic unit, or programmable gate array etc. The methods and functional modules may all be performed by a single processor or divided amongst several processors.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and/or block diagrams, as well as combinations of the blocks in the flow charts and/or block diagrams can be realized by machine readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices (such as the control apparatus 216) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:

ejecting a drop of printing fluid from a nozzle of a printhead into a drop detection zone;

determining an indication of detection of the drop within the drop detection zone; and providing an indication of a position of the printhead along a media advance direction based on the indication of detection of the drop.

2. A method according to claim 1 wherein determining the indication of detection of the drop within the drop detection zone comprises determining whether the drop has been detected at an expected location within the drop detection zone; and when the drop is not detected at an expected location, providing the indication of the position of the printhead comprises providing an indication that the printhead is not in an expected position.

3. A method according to claim 2 wherein, when the drop is detected at an expected location, providing the indication of the position of the printhead comprises providing an indication that the printhead is in an expected position.

4. A method according to claim 1 comprising:

determining, from the indication of the detection of the drop within the drop detection zone, which of a plurality of predetermined positions within a printhead carriage the printhead occupies.

5. A method according to claim 1 further comprising repeating the method for at least one other printhead.

6. A method according to claim 5 comprising, based on the indications of the positions of the printheads, determining an order of the printheads in a direction of printing.

7. A print apparatus comprising:

a carriage for receiving a printhead comprising a plurality of nozzles to fire drops of printing fluid;

a drop detector to detect drops fired from the printhead; and control apparatus to:

control the printhead to fire a drop of printing fluid from a nozzle;

receive a signal indicative of the detection of the ejected drop from the drop detector; and derive an indication of a position of the printhead along a media advance direction within the carriage based on the signal.

8. A print apparatus according to claim 7, wherein:

the carriage is to receive the printhead at one of a plurality of indexed positions, wherein the indexed positions are offset from one another in a direction of printing.

9. The print apparatus according to claim 7 wherein:

the carriage is to receive a plurality of printheads, wherein the relative order of the printheads in a direction of printing is configurable.

10. The print apparatus according to claim 9 wherein the control apparatus is to derive, from the indication of the position of the printheads within the carriage, a relative order of the printheads in the direction of printing.

11. The print apparatus according to claim 10 wherein the control apparatus is to determine if the relative order of the printheads is an expected order and, when the relative order of the printheads is not in an expected order, to generate an alert.

12. The print apparatus according to claim 7 wherein the carriage is to move in a scan axis perpendicular to a direction of media advance during printing and the control apparatus is further to control the carriage to position the printhead above the drop detector prior to deriving the indication of the position of the printhead.

13. The print apparatus according to claim 7 wherein the drop detector comprises an array of emitters and an array of receivers.

14. A non-transitory machine-readable medium comprising instructions which, when executed by a processor, cause the processor to:

control a specific nozzle of a printhead to fire a printing fluid drop into a drop detection zone of a print apparatus; and determine, from a detection of the drop within the drop detection zone, an indication of position of the printhead along a media advance direction.

15. The non-transitory machine-readable medium according to claim 14 comprising instructions which, when executed by a processor, cause the processor to:

determine, from the indication of the position of the printhead, whether the printhead is in an expected position in a direction of media travel during printing.

* * * * *